(12) United States Patent
Joo et al.

(10) Patent No.: US 11,020,710 B2
(45) Date of Patent: Jun. 1, 2021

(54) ULTRA LARGE-WIDTH AND CONSECUTIVE COATING DEVICE AND METHOD FOR MANUFACTURING MEMBRANE USING THE SAME

(71) Applicants: SK INNOVATION CO., LTD., Seoul (KR); SK IE TECHNOLOGY CO., LTD., Seoul (KR)

(72) Inventors: Dong Jin Joo, Daejeon (KR); Kyu Young Cho, Daejeon (KR); Yun Bong Kim, Daejeon (KR); Su Ji Lee, Daejeon (KR); Won Sub Kwack, Daejeon (KR); Hye Jin Kim, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 353 days.

(21) Appl. No.: 15/628,221

(22) Filed: Jun. 20, 2017

(65) Prior Publication Data

US 2017/0361283 A1 Dec. 21, 2017

(30) Foreign Application Priority Data

Jun. 21, 2016 (KR) .................. 10-2016-0077388

(51) Int. Cl.
| | |
|---|---|
| *B01D 71/26* | (2006.01) |
| *B01D 67/00* | (2006.01) |
| *C08J 7/04* | (2020.01) |
| *B29C 55/18* | (2006.01) |
| *C08J 5/18* | (2006.01) |
| *C08L 23/06* | (2006.01) |
| *B29C 55/00* | (2006.01) |
| *B29K 23/00* | (2006.01) |

(52) U.S. Cl.
CPC ......... *B01D 67/0088* (2013.01); *B01D 71/26* (2013.01); *B29C 55/18* (2013.01); *C08J 5/18* (2013.01); *C08J 7/0427* (2020.01); *C08L 23/06* (2013.01); *B01D 2323/42* (2013.01); *B29C 55/005* (2013.01); *B29K 2023/0683* (2013.01); *C08J 2323/06* (2013.01); *C08J 2429/04* (2013.01); *C08J 2433/04* (2013.01)

(58) Field of Classification Search
CPC .......... B29C 2793/0063; B05C 1/0808; B26D 1/025; B05D 1/28; F16D 1/116
See application file for complete search history.

(56) References Cited

U.S. PATENT DOCUMENTS

| | | | | |
|---|---|---|---|---|
| 4,165,194 | A * | 8/1979 | Flower | F16B 21/18 403/229 |
| 9,931,756 | B2 * | 4/2018 | Watanabe | B26D 1/02 |
| 2009/0211475 | A1 * | 8/2009 | Taylor | B41C 1/182 101/375 |

FOREIGN PATENT DOCUMENTS

WO WO-2016103754 A1 * 6/2016 ............... B26D 1/02

* cited by examiner

*Primary Examiner* — Alex A Rolland
(74) *Attorney, Agent, or Firm* — IP & T Group LLP

(57) ABSTRACT

Provided is an ultra large-width coating device applied to a consecutive process. More particularly, the present invention relates to a coating device capable of maximizing productivity by consecutively manufacturing a large-width film without reducing physical properties of the manufactured film by overcoming a problem in that a coating width is limited during a coating process using the existing contact type coating roller, and a method for manufacturing an ultra large-width membrane using the same.

3 Claims, 5 Drawing Sheets

ULTRA LARGE-WIDTH AND CONSECUTIVE COATING DEVICE AND METHOD FOR MANUFACTURING MEMBRANE USING THE SAME

CROSS-REFERENCE TO RELATED APPLICATIONS

This application claims priority under 35 U.S.C. § 119 to Korean Patent Application No. 10-2016-0077388, filed on Jun. 21, 2016, in the Korean Intellectual Property Office, the disclosure of which is incorporated herein by reference in its entirety.

TECHNICAL FIELD

The following disclosure relates to a large-width coating device applied to a process of consecutively manufacturing an ultra large-width membrane, and more particularly, to a coating device capable of maximizing productivity by consecutively manufacturing a large-width membrane without reducing physical properties of the manufactured membrane by overcoming a problem in that a coating width is limited during a coating process using the existing contact type coating roller upon manufacturing of the membrane for a secondary battery, and a method for manufacturing a membrane using the same.

BACKGROUND

To keep up with the increasing capacity and output of a secondary battery, there is a need to increase physical properties of a membrane for a secondary battery. The membrane mainly uses a polyolefin-based base film and realizes excellent physical properties such as strength, elasticity, and pore uniformity by subsequent processes such as pore formation and stretching. In addition, pores existing on a surface or an inside of the membrane are provided with active layers and realize ion conduction properties by a coating method using a coating solution including inorganic particles. At this time, if there is no pore structure in the membrane or when the pores are non-uniform even if the pores are present, performance and stability of a battery may be greatly reduced due to an imbalance of ion current flowing through the pores. Since manufacturing cost of the membrane applied to the secondary battery including the structural aspect is increased to secure improvement and stability in electrochemical characteristics, there is a need to develop a technology of lowering the manufacturing cost.

Meanwhile, among the manufacturing processes of the membrane, the coating process is an important process that affects the physical properties and the ion conductivity of the membrane. Generally, the coating process has used methods such as dip coating, die coating, spray coating, and gravure coating.

Among those methods, a contact type coating method of allowing a coating means to directly contact a coating solution to transfer the coating solution to a surface contacting a base film has been mainly used and a transfer roller having the surface contacting the coating solution that is coated with chromium to realize smooth coating has been used.

However, the transfer roller has a difficulty in manufacturing and high manufacturing cost, which is one of the factors that increase the manufacturing cost of the membrane. In addition, the transfer roller applied to the contact type coating method has restrictions in manufacturing, and therefore, a length of the transfer roller is limited to about 2 m and a diameter of the roller is also about 6 mm, such that it is difficult to perform the large-width coating when the transfer roller is applied to the process of consecutively manufacturing a membrane. Further, even if the length of the transfer roller is manufactured longer, the transfer roller is warped or trembled due to its own weight to cause a defective product, such that there is a limitation in improving the productivity of the membrane.

SUMMARY

An embodiment of the present invention is directed to providing a coating device for an ultra large-width membrane and a method for manufacturing an ultra large-width membrane using the same.

Another embodiment of the present invention is directed to providing an ultra large-width coating device capable of remarkably improving productivity with a high coating yield and a small loss rate of coating compositions to a width of a base film by performing large-width coating without limiting a length and a diameter of a coating roller of the ultra large-width coating device.

Still another embodiment of the present invention is directed to providing an ultra large-width coating device capable of manufacturing a membrane having excellent thermal stability and ionic conductivity by excellent coating performance.

Still yet another embodiment of the present invention is directed to providing a method and an apparatus for consecutively manufacturing an ultra large-width membrane with a high coating yield and a small loss rate of coating compositions using the coating device for an ultra large-width membrane.

In one general aspect, a coating device includes: a transfer roller coating a base film with a coating solution; a housing including a roller groove that has a part of the transfer roller inserted thereinto to rotate the transfer roller and filled with the supplied coating solution; and a coating solution supplier supplying the coating solution to the housing, in which the transfer roller may have two or more contact type coating rollers integrated by a connector.

A central axis of the connector may be on an extension of a rotary shaft of the coating roller and may fasten between two adjacent coating rollers.

A thickness of the connector is smaller than diameter of the coating roller.

The coating roller may be selected from the group consisting of a gravure roll, a wire bar, a micro gravure roll, a Meyer bar, a nano coater and a DM coater.

A surface of the housing may be made of at least any one selected from the group consisting of poly tetrafluoro ethylene and ultra high molecular weight polyethylene.

In another general aspect, an inline manufacturing method for consecutively manufacturing an ultra large-width membrane includes: forming a base film by stretching a sheet; coating a coating solution on one side or both sides of the base film; slitting the coated film in a longitudinal direction; and winding the slit films, respectively, in which the coating may use a transfer roller having two or more contact type coating rollers integrated by a connector.

A thickness of the connector is smaller than diameter of the coating roller.

The connector may have a length of 2 to 5% with respect to a length of the transfer roller.

In the slitting of the coated film in the longitudinal direction, the coated film may be slit parallel to the longitudinal direction of the film at a part where the coated film abuts the connector.

The coating roller may be selected from the group consisting of a gravure roll, a wire bar, a micro gravure roll, a Meyer bar, a nano coater and a DM coater.

Other features and aspects will be apparent from the following detailed description, the drawings, and the claims.

| [Detailed Description of Main Elements] | |
| --- | --- |
| 11: Transfer roller, | 12: Contact type coating roller, |
| 13, 14: Connector | |
| 21: Roller groove, | 22: Housing |
| 31: Coating solution introduction pipe, | |
| 32: Coating solution supplier | |
| 41: Motor | |
| 111: Casting roll | 112, 113, 114, 115: Guide roll |
| 210: Stretching or heat treatment means | |
| 310: Ultra large-width coating device | |
| 410: Drier | |
| 510: Winding roller | |
| B: Width of base film | |
| C: Entire coating width | |
| e1, e2: Size of connector | c1, c2, c3: Coated width |

DETAILED DESCRIPTION OF EMBODIMENTS

Hereinafter, an ultra large-width and consecutive coating device and a method for manufacturing an ultra large-width membrane using the same will be described in detail.

The present invention may be better understood by the following examples, which are for the exemplary purpose of the invention and are not intended to limit the scope of protection defined by the appended claims. Unless otherwise defined, technical terms and scientific terms used herein have the same meaning as commonly understood by those of ordinary skill in the art to which the present invention belongs.

The ultra large-width coating device according to an exemplary embodiment of the present invention may freely extend a length of a transfer roller to perform coating on an ultra large-width base film. Nevertheless, since the base film is not warped or trembled when applied to a process, it is possible to secure smooth coating and high coating uniformity. In addition, the present invention was completed by maximizing productivity with a high coating yield to a width of the base film to drastically reduce manufacturing cost of a membrane.

Figure 1:
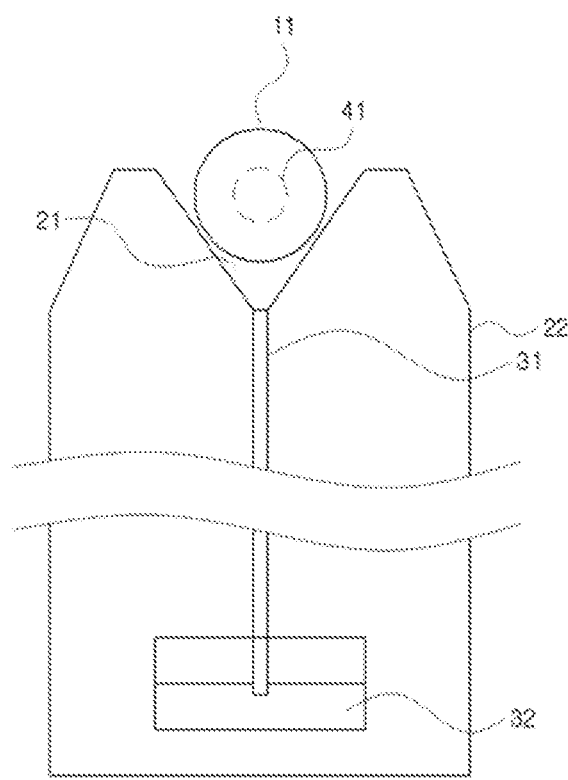
FIG. 1 is a diagram schematically illustrating an ultra large-width coating device according to an exemplary embodiment of the present invention.

FIG. 1 schematically illustrates an ultra large-width coating device according to an exemplary embodiment of the present invention.

The ultra large-width coating device includes a transfer roller 11 for coating a coating solution on a base film, a housing 22 including a roller groove 21 that has a lower portion of the transfer roller inserted thereinto and is filled with the coating solution through a coating solution introduction pipe 31, a coating solution supplier for supplying the coating solution to the housing 22, and a motor 41 for providing power for rotating the transfer roller 11.

At this time, the transfer roller 11 forms a coating layer by coating a coating solution on one surface of the base film to be coated, and a surface of the transfer roller 11 directly contacts the coating solution.

The transfer roller 11 includes contact type coating means such as the existing gravure roll and wire bar in the kind, but is not necessarily limited thereto. Preferably, it may be any one selected from the group consisting of a gravure roll, a wire bar, a micro gravure roll, a Meyer bar, a nano coater and a DM coater.

The transfer roller 11 is not limited in its length in a longitudinal direction that is a width direction with respect to the base film. The transfer roller is a means for directly contacting the coating solution to coat an object to be coated, and the existing transfer roller is limited in the length due to a problem in that the transfer roller has many restrictions in manufacturing since the surface of the transfer roller needs to be coated with chromium or the like, but the transfer roller 11 has an extended length by coupling at least two coating means to perform large-width coating.

Particularly, the width of the film is greatly increased by performing heat treatment or stretching on a sheet during a process of manufacturing a membrane. At this time, the coated width is significantly reduced compared to the film having the increased width, and thus a coating yield that is the length of the coated width in the length of the width of the base film is very low. This is a factor of wasting a non-coated part to very reduce productivity of a film and increase costs of the membrane. The present invention may solve the above problem and increase the coating uniformity to secure a stable structure of pores on the base film and an active layer over the entire surface of the pores, which may fundamentally implement excellent physical properties of the membrane.

Figure 2:
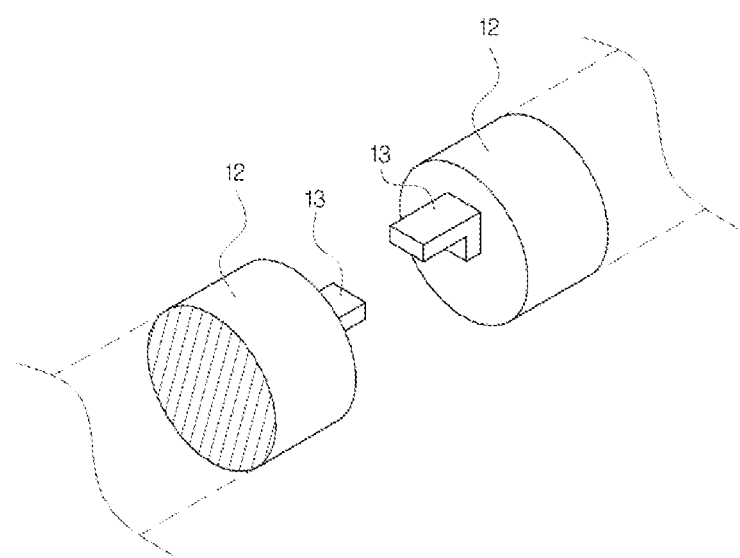
FIG. 2 is a perspective view schematically illustrating a transfer roller including a connector according to an exemplary embodiment of the present invention.
Figure 3A:
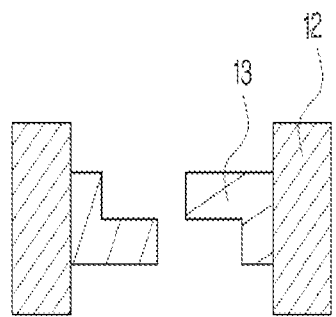
FIGS. 3A to 3D are diagrams schematically illustrating a form of the connector according to the exemplary embodiment of the present invention.
Figure 3B:
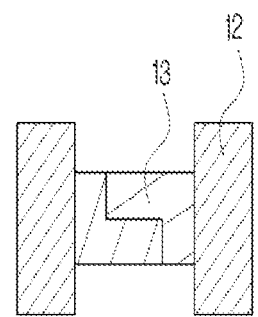
Figure 3C:
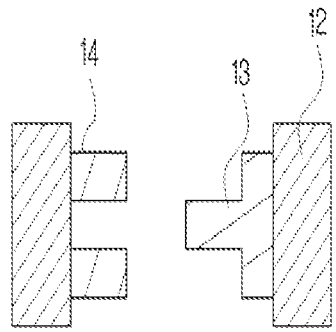
Figure 3D:
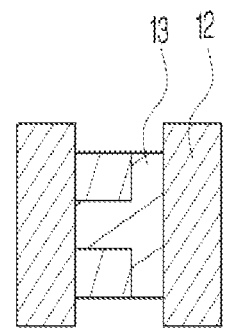

The transfer roller 11 has at least two contact type coating rollers 12 integrated by a connector 13. In detail, as can be seen from FIG. 2, the connector 13 may fasten the two coating rollers 12 to be connected. At this time, although a form of the connector 13 is not largely limited, as can be seen from FIGS. 3A to 3D, the connector 13 is formed at one end of the coating roller 12, and therefore the connector 13 may be fastened. The connectors 13 having a '⁻]'-letter shape as illustrated in FIG. 3A as an example of the shape of the connector are provided to be fastened with each other as illustrated in FIG. 3B and the connectors 13 and 14 having a shape of a female screw and a male screw as illustrated in FIG. 3A as another example of the shape of the connector may be provided to be fastened with each other as illustrated in FIG. 3D.

Since a central axis of the connector 13 is on an extension of a rotary shaft of the coating roller 12 and the rotary shaft of the coating roller 12 is rotated by the motor 41, a material of the connector 13 is not limited as long as the connector 13 may withstand a torque pressure enough to be rotated corresponding to the rotation of the motor 41. Further, a shape of a cross section perpendicular to the rotary shaft of the connector 13 may have various shapes such as a sphere, an ellipse, and a polygon, and is not particularly limited as long as it does not affect the rotation of the coating roller.

In addition, a thickness of the connector 13 may be smaller than the diameter of the coating roller 12. If the thickness of the connector 13 is equal to or greater than the diameter of the coating roller 12, the connection part may be non-uniformly coated. In addition, foreign materials may be generated due to scattering of inorganic particles upon trimming after drying, and the yield may be lowered. The diameter of the coating roller 12 means a vertical diameter of the rotary shaft of the coating roller 12, and the thickness of the connector means the longest length perpendicular to the rotary shaft of the connector.

The housing 22 is provided with a roller groove 21 so that the lower portion of the transfer roller 11 is seated while being in contact with the filled coating solution. The roller groove may have a shape in which a cross-sectional area thereof becomes gradually narrower toward the bottom or it may be rounded corresponding to a circumference of the roller, but is not limited thereto. At this time, the material of the roller groove 21 may be at least any one selected from the group consisting of poly tetrafluoro ethylene, that is, Teflon and ultra high molecular weight polyethylene (UHMWPE). It does not absorb the coating solution, is chemically stable, and has better abrasion resistance and lubricity.

The transfer roller 11 is seated in the roller groove 21 of the housing 22, which means that it abuts the roller groove 21 in contact with the coating solution. The coating device according to the exemplary embodiment of the present invention may further include a doctor knife capable of controlling the coated amount depending on the thickness of the coating layer at the time of the coating.

Figure 4:
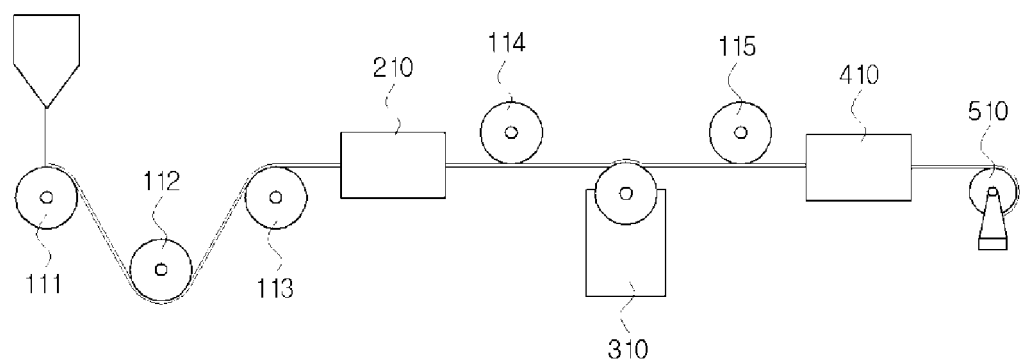
FIG. 4 is a diagram schematically illustrating the device for manufacturing an ultra large-width membrane according to the exemplary embodiment of the present invention.

FIG. 4 schematically illustrates a device for manufacturing an ultra large-width membrane according to an exemplary embodiment of the present invention, which is an inline manufacturing device for consecutively manufacturing an ultra large-width membrane.

The present invention may consecutively manufacture an ultra large-width membrane using the above-described inline manufacturing device, and more preferably, may be applied to manufacturing of a membrane for a secondary battery.

The method for manufacturing an ultra large-width membrane according to the exemplary embodiment of the present invention includes a step of forming the base film by stretching the sheet, a step of coating the coating solution on one or both surfaces of the base film, a step of slitting the coated film in the longitudinal direction, and a step of winding the slit films, respectively, in which the coating step is performed using the transfer roller having two or more contact type coating rollers integrated by the connector.

Specifically, the method for manufacturing an ultra large-width membrane according to the exemplary embodiment of the present invention may include the step of forming the sheet, the coating step, the drying step, the slitting step, and the winding step.

The step of forming the sheet is melt-extruding a polymer film composition as a constituent component of the base film to die-cast the melt-extruded composition by a die casting roll 111 to form the base film. At this time, the sheet is stretched or heat-treated using a stretching or heat treatment means 210. The thus stretched or heat-treated base film is subjected to the coating step of coating the coating solution on one surface or both surfaces thereof with an ultra large-width coating device 310 according to the exemplary embodiment of the present invention. At this time, the coating step is performed using the transfer roller having two or more contact type coating rollers integrated by the connector and the large-width coating may be applied to the entire surface of the film of which the length of width is increased by stretching or heat treatment in the previous step. Thereafter, the coated film is subjected to the drying step using a dryer 410. The slitting step of slitting the dried film in the longitudinal direction is performed. At this time, the dried film is slit parallel to the longitudinal direction of the film at a portion where the dried film abuts the connector. Each of the thus slit films is wound. The guide rollers 112, 113, 114, and 115 and the winding roller 510 are each provided for moving and winding the film, which is illustrated for illustrative purposes only and therefore may be changed without being limited to the drawings.

Hereinafter, a method for manufacturing an ultra large-width membrane will be described as an example.

Figure 5:
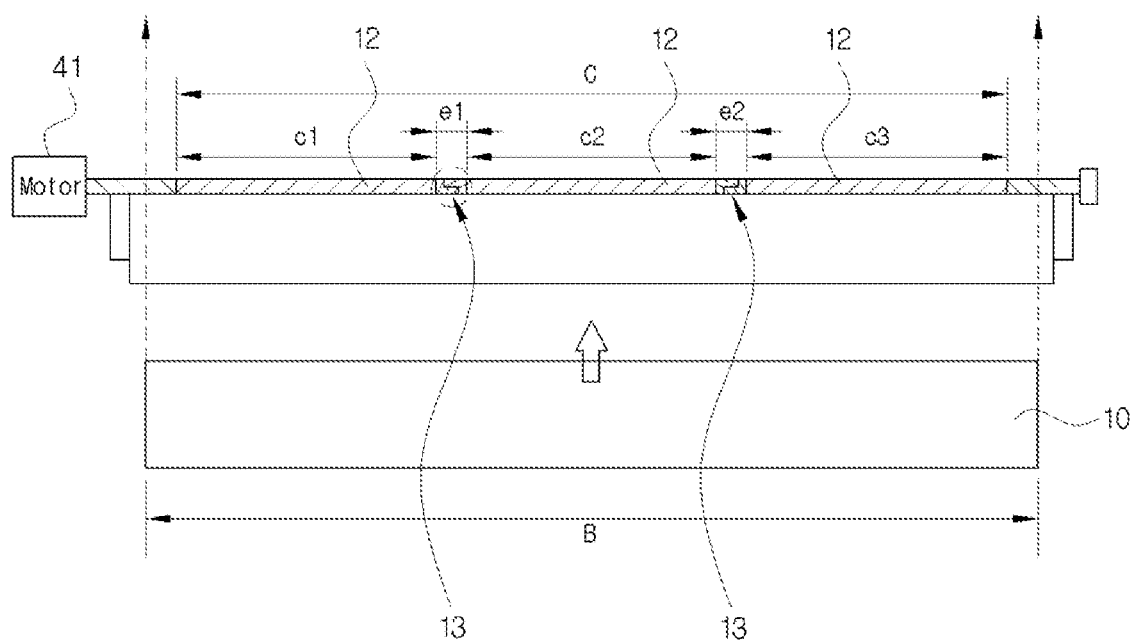
FIG. 5 is a diagram schematically illustrating wire bar coating of a device for manufacturing an ultra large-width membrane according to an exemplary embodiment of the present invention

The ultra large-width membrane for the secondary battery is manufactured by melt-extruding a composition including a polyolefin resin to form the sheet, stretching the manufactured sheet to form the base film, heat treating the stretched sheet, and then coating at least one surface of the heat-treated base film with the coating solution including a heat-resistant resin. At this time, the coating may be performed by engaging two or more wire bars or the gravure rolls through the connector and rotating the engaged wire bars or gravure rolls by the motor 41, thereby making it possible to perform a large-width coating more than twice the existing coating width. FIG. 5 schematically illustrates the wire bar coating according to the coating process during the manufacturing of the ultra large-width membrane. That is, to perform the coating at a large width corresponding to the width of the base film 10, a "modified wire bar coating method", not the existing wire-bar coating method, is used. The "modified wire bar coating method" is a coating method of using more than two wire bars for large-width coating and the respective wire bars may be engaged with each other to rotate by one motor to form a coating layer. At this time, the portions to be engaged with each other, that is, the connectors are uncoated. This may uniformly coat consecutively most of the large-width base film without loss, and in particular, may prevent shrinkage in the existing uncoated portions or sagging or wrinkles occurring when passing through a tenter type drier in a subsequent process, such that the coating yield may be increased and the productivity may be drastically improved. More specifically, the coating yield which is a ratio of a total coating width C to a width B of a base porous film is drastically improved. This becomes at least twice as wide as widths c1, c2, and c3 coated by the individual coating means of the existing wire bar or the like, such that the coating yield may be drastically increased and the membrane may be manufactured at the corresponding productivity and at lower cost. At this time, it is preferable to minimize sizes e1 and e2 of the connectors which are the parts coupled by two or more coating means, but it is preferable that they have a length of 2 to 5% with respect to the length of the transfer roller. If the above range is satisfied, since the part of the connector supports the coating roller by the supply of the coating solution, the problems such as the warpage of the large-width transfer roller having a long length do not occur, such that the uniform coating may be possible and the coating yield may be maximized.

Hereinafter, the present invention will be described in more detail based with respect to the following examples but the scope of the present invention is not limited thereto.

(Productivity Evaluation)

A ratio of the production amount of good product (m²/hr) of the base film after the heat treatment process per unit time (1 hr) in consecutive production over 20 hours and the production amount of good product (m²/hr) of the membrane produced by performing the coating on the base film subjected to the heat treatment process was used. The calculation of productivity used the following Equation 1. For comparison on the same basis, the production amount per unit time of the film subjected to the heat treatment process like the base film before coating in the manufacturing method according to the exemplary embodiment of the present invention and the non-consecutive manufacturing method was defined as the production amount of the base film. Specifically, the loss due to wound roll replacement and the loss occurring in the non-consecutive process or the like are included in the production amount of the base film but are excluded from the production amount of the membrane.

Productivity (%)=(production amount of membrane (m²/hr))/(production amount of base film (m²/hr))×100    [Equation 1]

EXAMPLE 1

A composition containing 28 wt % of a polyolefin resin (high density polyethylene having a weight average molecular weight of $3.0 \times 10^5$ g/mol and a melting temperature of 135° C.) and 72 wt % of a diluent (paraffin oil having a kinetic viscosity of 160 cSt at 40° C.) was extruded at 230° C. using a biaxial compounder, and then the sheet was manufactured using a T-die and a casting roll and successively stretched 7.5 times at 112° C. in a longitudinal direction and 6 times at 126° C. in a transverse direction. Thereafter, the heat treatment was performed by hot stretching 1.5 times and heat setting. The manufactured base film had a width of 4,300 mm. The manufactured base film was coated consecutively. The coating solution used those consisting of $Al_2O_3$ powder (average particle size of 0.5 μm), polyvinyl alcohol, acrylic latex solid and deionized water.

The coating was performed by a modified wire bar coating method using a modified wire bar in which three wire bars (length: 1,400 mm) are fastened to each other by two connectors having a width of 107.5 mm. A coating solution was coated on one surface of the base film manufactured by the consecutive process, and then a solvent was dried and removed in a section in which a temperature of 110° C. is set, such that the polyolefin-based membrane having the coating layer of a thickness of 5.0 μm was manufactured. The uncoated portion and both ends of the membrane were slit to obtain three final membranes having a width of 1,350 mm, and the production rate was 5 m/min and the produced product replaced the roll in a unit of 500 m. In the process of replacing the wound roll with a new roll, a product loss of 20 m occurred. The productivity of the manufactured membrane was shown in the following Table 1.

EXAMPLE 2

Example 2 was performed in the same manner as the above Example 1. The width of the base film manufactured by successively stretching the manufactured sheet 6.5 times at 115° C. in a longitudinal direction and 6.5 times at 127° C. in a transverse direction, and performing the heat treatment thereon was 4,200 mm.

The coating was consecutively performed on the base porous film manufactured by the above method.

The coating solution used for the coating consisted of 46 wt % of $Al_2O_3$ powder (average particle size of 0.8 μm), 1.9 wt % of polyvinyl alcohol having a melting temperature of 220° C., 1.4 wt % of acrylic latex solid having a glass transition temperature of −45° C., and 50.7 wt % of deionized water, and the solution was prepared in advance and used before the application.

The coating was performed by the modified wire bar coating method using the modified wire bar in which three wire bars (length: 1,300 mm) are fastened to each other by two connectors having a width of 105 mm. A coating solution was coated on both surfaces of the base film manufactured by the consecutive process, and then a solvent was dried and removed in a section set at 130° C., such that the polyolefin-based membrane having the coating layer of a thickness of 6.0 μm was manufactured. The uncoated portion and both ends of the membrane were slit to obtain three final membranes having a width of 1,250 mm, and the production rate was 5 m/min and the produced product replaced the roll in a unit of 500 m. In the process of replacing the wound roll with a new roll, a product loss of 20 m occurred. The productivity of the manufactured membrane was shown in the following Table 1.

COMPARATIVE EXAMPLE 1

The base film was manufactured by the same method as the above Example 2. At this time, the width of the manufactured base film was 4,200 mm like the above Example 2.

The coating was consecutively performed on the base film manufactured by the above method using the same coating solution as used in the above Example 2.

The coating was performed on both surfaces of the base film manufactured by the above method with a width of 2,000 mm by the consecutive process using the general wire bar coating method using one wire bar, and then the solvent was dried and removed at a section in which a temperature of 110° C. is set, such that the polyolefin-based membrane having a coating layer having a thickness of 6.0 μm was manufactured. The uncoated portion and both distal ends of the membrane are slit and thus the width of the final membrane was 1,950 mm, the production rate thereof was 5 m/min, and the length of the final product was 500 m. The remaining processes such winding were performed in the same manner as the above Example 2.

COMPARATIVE EXAMPLE 2

Comparative Example 2 was performed in the same manner as the above Comparative Example 1, except that general gravure single-sided coating having a coating width of 2,000 mm was used instead of double-side coating of a general wire bar having a coating width of 2,000 mm.

COMPARATIVE EXAMPLE 3

Comparative Example 3 was performed in the same manner as the above Comparative Example 1, except that general die double-side coating having a coating width of 2,000 mm was used instead of the double-side coating of a general wire bar having a coating width of 2,000 mm. In this case, the coating is non-uniform due to the flexibility of the base film and the trembling phenomenon of the drier, and therefore the product may not be commercialized.

COMPARATIVE EXAMPLE 4

Comparative Example 4 was performed in the same manner as the above Comparative Example 3, except that the general die having a coating width of 2,000 mm was attached in parallel to increase the coating width at the time of single-sided coating. In this case, as in Comparative Example 3, the product may not be commercialized.

TABLE 1

| Division | Coating method | | Width of base (mm) | Width of coating | | Finished product | | | | |
|---|---|---|---|---|---|---|---|---|---|---|
| | Coating means | Coating surface | | Width of section (mm × numbers) | Entire width (mm) | Width of finished product (mm) | Number of finished product | Length (m) | Loss of winding (m) | Productivity (%) |
| Example 1 | Modified wire bar | One surface | 4,300 | 1,400 * 3 | 4,200 | 1,350 | 3 | 500 | 20 | 90.4 |
| Example 2 | Modified wire bar | Both surfaces | 4,200 | 1,300 * 3 | 3,900 | 1,250 | 3 | 500 | 20 | 85.7 |
| Comparative Example 1 | Normal wire bar | Both surfaces | 4,200 | 2,000 * 1 | 2,000 | 1,950 | 1 | 500 | 20 | 45.7 |
| Comparative Example 2 | Gravure | One surface | 4,200 | 2,000 * 1 | 2,000 | 1,950 | 1 | 500 | 20 | 45.7 |
| Comparative Example 3 | Die | Both surfaces | 4,200 | 2,000 * 1 | 2,000 | No security of coating uniformity in longitudinal direction/transverse direction | | | | |
| Comparative Example 4 | Die | One surface | 4,200 | 2,000 * 1 | 4,000 | No security of coating uniformity in longitudinal direction/transverse direction | | | | |

The ultra large-width coating device according to the exemplary embodiment of the present invention has the advantage of maximizing the productivity of the membrane by performing the large-width coating on the large-width base film supplied through the pretreatment process in the process of manufacturing the membrane for the secondary battery. That is, it is possible to maximize the productivity of the membrane with the high coating yield and the small loss rate of the coating compositions to the width of the base film to which the coating compositions are transferred.

Further, the existing coating roller applied to the membrane for the secondary battery is a means for forming the pores on the base film and the active layer on the entire surface of the pores and has a limited length or diameter due to restrictions on the physical properties or the electrochemical characteristics of the membrane for the secondary battery.

On the other hand, the ultra large-width coating device according to the exemplary embodiment of the present invention may solve the problem in that even if the length of the transfer roller is extended to the length of the ultra large-width from 2 m or more that is the existing length to for example, 4 m or more and 6 m or more, the coating performance is non-uniform and the load applied to the entire length of the coating roller is non-uniform.

Therefore, it is possible to perform the uniform ultra large-width coating without restrictions on the length and diameter of the transfer roller and realize the excellent physical properties of the membrane.

In addition, the length of the width of the supplied film may be flexible, and the movement, the installation, and the maintenance may be easy.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A method for manufacturing a membrane, comprising:
   forming a base film by stretching a sheet;
   coating a coating solution on one side or both sides of the base film;
   drying the coated film;
   slitting the dried film in a longitudinal direction; and
   winding the slit films, respectively,
   wherein the coating uses a transfer roller having two or more contact type coating rollers integrated by a connector,
   wherein the connector is formed at an end of the coating roller,
   wherein a length of the coating roller is larger than 2,000 mm,
   wherein a thickness of the connector is smaller than a diameter of the coating roller, and
   wherein the connector has a length of 2 to 5% with respect to a length of the transfer roller.

2. The method of claim 1, wherein in the slitting of the coated film in the longitudinal direction, the coated film is slit parallel to the longitudinal direction of the film at a part where the coated film abuts the connector.

3. The method of claim 1, wherein the coating roller is selected from the group consisting of a gravure roll, a wire bar, a micro gravure roll, a Meyer bar, a nano coater and a DM coater.

* * * * *